Nov. 1, 1949  C. A. DE GIERS ET AL  2,486,930
LIQUID LEVEL GAUGE WITH TILT CORRECTION
Filed Dec. 29, 1945
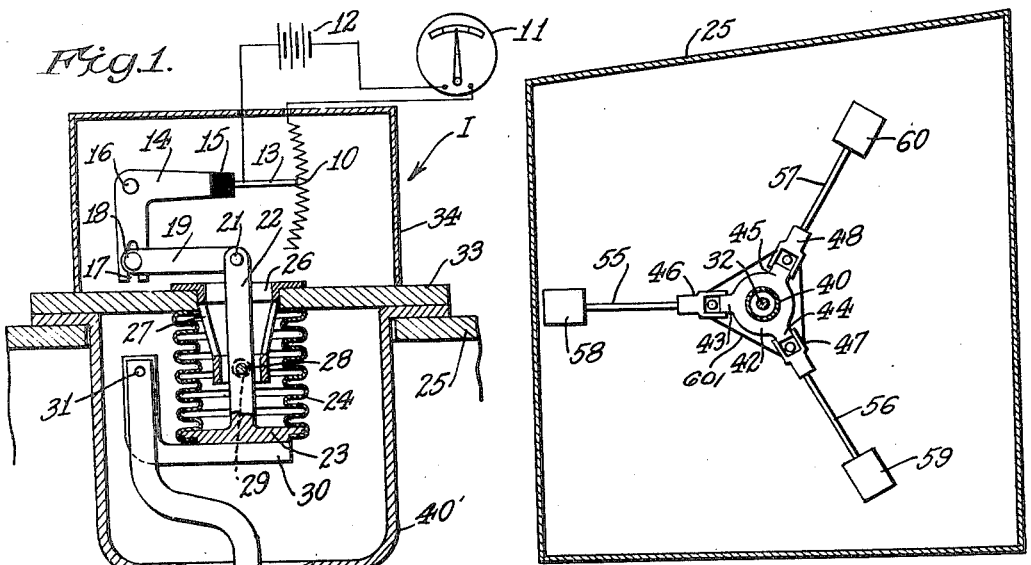
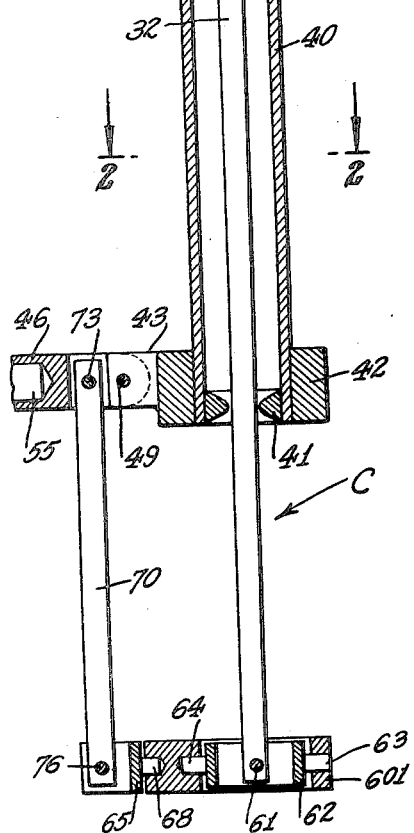
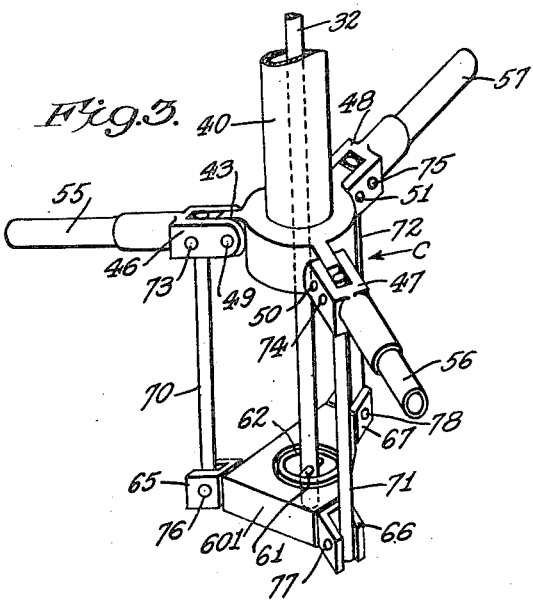
INVENTORS
CLARENCE A. DE GIERS
ROLF A. F. SANDBERG
BY
Ernest D. Given
ATTORNEY Patented Nov. 1, 1949

2,486,930

UNITED STATES PATENT OFFICE 2,486,930

LIQUID LEVEL GAUGE WITH TILT CORRECTION

Clarence A. de Giers, Forest Hills, and Rolf A. F. Sandberg, Queens Village, N. Y., assignors to The Liquidometer Corporation, Long Island City, N. Y., a corporation of Delaware Application December 29, 1945, Serial No. 638,284

4 Claims. (Cl. 73—313)

This invention relates to liquid level measuring devices, particularly to liquid level measuring devices in which the position of a telemetering transmitter element as a slider contact on a resistance element controls the indications of the measuring device, the slider position being controlled by the movement of a float system floating on the liquid level to be supervised.

Liquid level measuring devices of the type described above are sufficiently accurate for many practical purposes when the attitude of the liquid level relative to the liquid container or tank remains approximately unchanged. However, when the liquid container is, for instance, the fuel tank of an aircraft, tank movements will cause a change of the liquid attitude relative to the tank so that the liquid level measured at the location of a float is not necessarily the average liquid level but may be below or above such average level. Consequently, the liquid level measured by such float no longer constitutes a true basis for calculation of the liquid contents of the tank, and the indications on the scale of the indicating means, when calibrated in units of liquid height or liquid contents of the tank, are no longer reliable. Analogous considerations apply, of course, when the device is used as a control instrument.

Accordingly, it is an object of the invention to provide a liquid level measuring device capable of furnishing accurate measurements independently of the attitude of the liquid to be supervised relative to the liquid container.

Another object of the invention is to provide a liquid level measuring device, the indications of which are continuously and automatically corrected for a change of liquid attitude relative to the container, caused, for instance, by a tilting of the container.

Another object of the invention is to provide a control system for a measuring device of the type described, which system measures the liquid level to be supervised at at least three spaced points located out of any single vertical plane from one another and then averages these individual measurements, the movable element of the telemetric transmitter or slider contact position of the device being controlled by the average level measurements, so that the indications of the device are always a function of the average liquid level or substantially the true liquid level.

Another object of the invention is to provide a control system for a measuring device of the type described, which system includes a linkage arrangement having such a ratio of transmission that the frictional resistance usually present in the bearings and pivot points of the device is comparatively small in relation to the force produced by a displacement of the float system in response to a change of the liquid level. As a result, the force produced by a movement of the float system which in turn controls the indications of the device, as previously explained, will easily overcome the frictional resistance so that this resistance cannot appreciably affect the indications of the device.

Another object of the invention is to provide a control system for a measuring device of the type described, which system is capable of measuring the entire range of liquid change in the container by a comparatively small movement of the member of the device controlling the position of the slider contact.

Other and further objects, features and advantages of the invention will appear hereinafter and be pointed out in the appended claims forming part of the application.

In the accompanying drawing a now preferred embodiment of the invention is shown by way of illustration and not by way of limitation.

In the drawings:

Fig. 1 is a view substantially in vertical section of a measuring device according to the invention, part of the device being broken away;

Fig. 2 is a view substantially in horizontal section of the device along line 2—2 of Fig. 1 and on a reduced scale; and Fig. 3 is a perspective view of part of the control system of the device.

The liquid level measuring device according to the invention comprises a conventional indicating system or telemetric transmitter generally designated "I" and attached to the tank containing the liquid to be measured, such as fuel, and a control system generally designated "C" for controlling the indications of the indicating system according to changes of the liquid level in the tank, as will be more fully explained hereinafter.

The indicating system, as illustrated, comprises a resistance 10 connected in a circuit with an indicating instrument 11, such as a milliammeter, calibrated in units of liquid height or liquid contents, for instance in gallons, through a source of current such as a battery 12 and a slider contact 13 engaging resistance 10. As will be obvious, the indications of the instrument 11 are controlled by the position of slider 13 on the resistance 10. The slider 13 is supported by one arm of a bell crank 14, insulated therefrom by an insulation member 15. The bell crank 14 is pivoted at fixed point 16, the second arm of the bell crank being provided with an elongated slot 17 which is pivotally connected at 18 to a link 19. The position of the pivot 18 along the elongated slot can be fixed by means of a set screw (not shown) or any other suitable means. This permits an adjustment of the ratio of transmission between the slider 13 and actuating means including the float system hereinafter described.

The link 19 is pivoted at 21 to one arm of a two-arm lever 22. The other arm of lever 22 carries rigid therewith a flange 23 fastened to a seal 24 of the bellows type, the lower end of the bellows being completely closed by the flange 23. The lever 22 extends through an opening 26 in the wall of a tank 25 in which opening is also inserted a hollow bracket 27. This bracket is supported by the base plate 33 of a housing 34. Base 33 also supports the upper end of bellows 24 and rests upon and is secured to the top wall of the tank 25 fastened thereto by any suitable means. Bracket 27 mounts a pin 28 serving as pivot for lever 22. Spacers 29 are provided to prevent shifting of lever 22 axially of the pin 28. Rigid with the flange 23 is a bent arm 30 which is pivoted at 31 to a push-pull rod 32. As will be apparent, axial movement of the rod 32 will cause the lever 22 to rock about its pivot 28, the flexibility of the bellows 24 permitting such movement. The movements of the lever 22 are transmitted through the link 19 and bell crank 14 to the slider 13 which will slide over the resistance 10 accordingly. Consequently, a given axial movement of rod 32 will result in a corresponding displacement of the slider 13 so that the indications of instrument 11 will be a function of the axial movements of the rod 32.

The indicating system hereinabove described is only an illustration of the type of indicating systems which may be advantageously used in a measuring device according to the invention. It should be noted in this connection that any other suitable indicating system usually of the telemetric type may be employed. The only essential is that the indicating system be one which can be controlled by substantially axial movements of rod 32. The axial movements of this rod are controlled by the control system "C" of the present invention which will now be described in detail.

The entire control system is supported by a member 40 fastened to base plate 33 or to a wall of tank 25. The member 40 is shown as being tubularly shaped, the upper portion 40' serving as a housing for the bellows and part of the linkage system of the indicating system "I" above described. At the lower end of the member 40 or at any other suitable portion thereof, guide means 41 are provided to limit swinging movements of rod 32. The lower end of the member 40 also supports a collar 42 having three extensions 43, 44 and 45, equally spaced about the circumference of the collar. Each of the extensions serves as a support for one of the bifurcated sleeves 46, 47 and 48 respectively each having side arms or jaws pivotally connected to the extensions by pins 49, 50 and 51 respectively. Each of the sleeves receives one of the float arms 55, 56 and 57 respectively. These arms are so constructed that their axes are substantially in alignment with the respective pivots 49, 50 and 51, and each supports one of the floats 58, 59 and 60 respectively, floating on the level of liquid in tank 25. They are so positioned or relatively arranged that they will detect variations of the liquid level from normal at different portions of the liquid surface. Fig. 2 illustrates a suitable distribution of the floats in the tank, but it should be understood that the invention shall neither be limited to the float distribution illustrated in Fig. 2 or to the uses of only three floats. In order that the indication be reasonably accurate irrespective of tilting of the tank in any direction, it is necessary that the indication be responsive to a resultant or average of the liquid levels at at least three horizontally spaced points, which are not located in any one vertical plane, i. e. which are out of horizontal alignment with one another. There is shown in the drawings an apparatus wherein the floats are arranged substantially at the corners of an equilateral triangle as seen in plan in Fig. 2. Other arrangements of at least three floats which could accomplish the purposes herein set forth will occur to those skilled in the art and are to be considered as coming within the scope of the present invention and of the present claims.

The rod 32 supports at its lower end a plate member 601. This plate is suspended on rod 32 by means of a conventional gimbal suspension. However, it should be understood that any other suspension, such as a universal joint, can be used which permits limited swinging movements of plate 601 relative to rod 32 but at the same time will transform a movement of the center portion of the plate 601 to a substantially axial movement of rod 32. The gimbal suspension, as illustrated, comprises a pin 61 passed through the rod 32 and supported at both ends by the intermediate gimbal member 62. Gimbal member 62 is pivotally supported from the plate 601 by means of pins 63, 64 arranged coaxially at right angles to the axis of the pin 61.

The plate 601 is shown as having a substantially triangular shape. At each corner of the triangle, there is provided a bifurcated member 65, 66 and 67 respectively, pivotally supported by plate 601 by means of pins 68 arranged substantially radially of the gimbal suspension.

Swinging movements of float arms 55, 56 and 57 are transmitted to the member 601 and hence rod 32 by means of connecting links 70, 71 and 72. One end of each link is pivotally connected to the respective members 46, 47 and 48 by means of pins 73, 74, 75 respectively, and the other end of each link is connected to bifurcated members 65, 66, 67 respectively by pins 76, 77 and 78.

The operation of a measuring device according to the invention is as follows:

Let it be assumed that tank 25 is partly filled with fuel or any other liquid and that floats 58, 59, 60 float on the liquid level. Let it further be assumed that the liquid level rises or falls, say rises, uniformly, that is without a change of the attitude of the liquid level relative to the tank. Then, all three floats will rise uniformly and float arms 55, 56 and 57 will make equal angular movements. As a result, plate 601 will be raised correspondingly in a parallel plane and with it the rod 32. This axial upward movement of rod 32 will cause a corresponding indication on instrument 11. Let it now be assumed that the liquid level changes its attitude relative to tank 25, more particularly that float 58 is raised less than floats 59 and 60. As a result, the plate 601 will be somewhat tilted, the corner of the supporting member 65 being the lowest point. At the same time the plate and with it rod 32 will be raised to a certain extent, such raise corresponding to the average liquid level of the liquid in the tank. This average level will be the level at a point in alignment with the axis of rod 32. In order to obtain an accurate indication of the average liquid level the control system is preferably so positioned that the axis of rod 32 is located perpendicularly to the crossing point of the two diagonals of a cross-section of the tank 25.

It will now be obvious that rod 32 will always be placed in an axial position corresponding to the average liquid level in tank 25, or, in other words, the control system "C" will automatically correct for a tilt of tank 25 so that the indications of instrument 11 are a true function of the average liquid level or the liquid contents in tank 25.

It will further be apparent that for each float arm 55, 56 and 57 the length of the lever arm thereof between a float and the respective pivot point is much greater than the length of the lever arm between the pivot points 73, 74 and 75 and the pivot points on the collar 42. Hence the lifting power of the float arms exerted upon the plate 601 is very great in comparison with the frictional resistance at the various pivot points and in the bearings of the control system. As a result, such frictional resistance will not influence the axial position of the rod 32 to any appreciable extent, so that this rod is placed accurately in a position corresponding to the average liquid level. Furthermore, it is possible to use floats having a comparatively small size.

While the invention has been described in detail with respect to a certain now preferred example and embodiment of the invention, it will be understood by those skilled in the art after understanding the invention, that various changes and modifications may be made without departing from the spirit and scope of the invention and it is intended therefore, to cover all such changes and modifications in the appended claims.

What is claimed is:

1. Apparatus for measuring the level of liquid in a tank independently of tilting of the tank, comprising indicating means, at least three floats positioned in horizontally spaced relation to and out of alignment with one another in said tank and arranged to be supported by the liquid therein to detect the liquid level independently at at least three horizontally spaced parts of the tank respectively, a member bodily movable and also tiltable, means mechanically connecting each of said floats to said member constructed and arranged so that the tilting only of said tank without change in the liquid volume therein will result only in the tilting of said member, while change in the volume of the liquid in said tank will result in a bodily movement of said member irrespective of its tilted position, and means connected to said member by a universal joint so as to be independent of the tilting of said member but subject to the bodily movement thereof for connecting said member to said indicator so that bodily movement of said member will result in controlling the position of said indicator.

2. A measuring device for measuring the level of a liquid contained in a container, comprising an indicating means, a rod, means controlled by the axial position of said rod for controlling the indications of the indicating means, a stationary bracket, at least three floats positioned to detect the liquid level at horizontally spaced portions of the liquid out of alignment with one another, an arm supporting each of the floats and pivotally connected to the bracket, a plate member connected to said rod by a universal joint, and mechanical linkages pivotally connecting each of said float arms and said plate member, the aforesaid parts being effective for transforming a resultant of the swinging movements of the respective float arms into axial movements of the rod and for moving said rod in an axial direction in accordance with the average liquid level in the container.

3. A device for measuring and indicating changes in the volume of liquid in a tank which is subject to tilting, which comprises, in combination, a movable indicator member, a control member movable to effect movements of said indicator member, a stationary supporting member, at least three arms pivoted at substantially equiangularly spaced points on and extending radially from said supporting member, said arms being mounted to swing in substantially vertical planes radial of said support, floats on said arms respectively arranged to be supported by the liquid in the tank, a plate member, a gimbal connection between said plate member and the aforesaid control member, and mechanical linkages connecting the aforesaid pivoted arms to said plate member and acting to adjust said plate member to conform to the tilt of the tank and to cause said plate member to actuate the control member.

4. Apparatus for measuring the level of liquid in a tank independently of the tilting of the tank, comprising an indicating means outside said tank, a substantially tubular support located centrally of the upper portion of the tank, rigid therewith and extending downwardly thereinto, three radially extending arms pivoted to said support on substantially horizontal axes and arranged for swinging movement in vertical planes radial of said support, a float carried by each of said arms and arranged to be supported by the liquid in said tank, a plate member mounted for both bodily and tilting movements and located below and substantially in alignment with said support, articulated means connecting each of said arms with said plate member so that the position of said plate member is a resultant of the positions of said floats, a central actuating rod extending through said support and connected to said plate member by a gimbal connection, and means actuated by said actuating rod for operating said indicating means, the last named means including a bellows preventing egress of gaseous material in said tank to the outside thereof while permitting the transmission of mechanical movement through said tank for actuating said indicating means.

CLARENCE A. DE GIERS.
ROLF A. F. SANDBERG.

REFERENCES CITED

The following references are of record in the file of this patent:

FOREIGN PATENTS

| Number | Country | Date |
|--------|---------|------|
| 601,334 | France | Nov. 28, 1925 |
| 653,112 | France | Oct. 30, 1928 |